United States Statutory Invention Registration [19]

[11] Reg. Number: H217

Jorczak [43] Published: Feb. 3, 1987

[54] RECOIL MECHANISM

[75] Inventor: John K. Jorczak, Castleton, N.Y.

[73] Assignee: The United States of America as represented by the Secretary of the Army, Washington, D.C.

[21] Appl. No.: 685,647

[22] Filed: Dec. 24, 1984

[51] Int. Cl.[4] ..... F41F 19/02; F41F 19/14
[52] U.S. Cl. ..... 89/43.01
[58] Field of Search ..... 89/43.01, 198; 188/282

[56] References Cited

U.S. PATENT DOCUMENTS

| | | | |
|---|---|---|---|
| 1,164,371 | 12/1915 | Lovejoy | 188/282 |
| 1,575,845 | 3/1926 | Joyce | 89/43.01 |
| 1,825,233 | 9/1931 | Joyce | 89/43.01 |
| 2,966,829 | 1/1961 | Tannenbaum | 89/43.01 |
| 3,034,605 | 5/1962 | Pernini | 188/282 |
| 3,888,436 | 6/1975 | Sealey | 188/282 |

FOREIGN PATENT DOCUMENTS

| | | | |
|---|---|---|---|
| 0079604 | 12/1919 | Fed. Rep. of Germany | 89/43.01 |

*Primary Examiner*—Stephen C. Bentley
*Assistant Examiner*—Stephen Johnson
*Attorney, Agent, or Firm*—Anthony Lane; Robert Gibson; Edward F. Costigan

[57] ABSTRACT

A hydraulic recoil mechanism, which may be used as a shock absorbing device controls both the recoil and counter-recoil motion of a cannon. Main recoil energy is dissipated via a movable cylindrical piston rod which pumps hydraulic fluid through a series of orifices into a primary chamber and is subsequently metered through an orifice effected by the traveling piston head and a fixed variable geometry control rod. A buffer spear arrangement integrated at the opposing end of the control rod dissipates final counter-recoil energy via a metering cavity contained in the returning piston. The piston rod assembly carries a ring-like floating piston which, upon recoil, closes a by-pass orifice and, upon counter-recoil, opens the by-pass orifice. A temperature compensator mechanism is also integrated into the system to accommodate thermal expansion of the fluid during sustained operation.

9 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RECOIL MECHANISM

GOVERNMENTAL INTEREST

The invention described herein may be manufactured, used and licensed by or for the Government for Governmental purposes without the payment to me of any royalties thereon.

BACKGROUND OF THE INVENTION

The present invention relates to shock absorbing and damping devices and more particularly to a hydraulic device to absorb energy from a recoil of a gun barrel.

Shock absorbing devices (energy dissipative mechanisms) are widely used when it is desired to absorb or dampen the effect of a sudden movement. For example, hydraulic shock absorbers are used between cars on trains and as part of the suspension system on automobiles. In hydraulic damper systems a liquid, usually an oil, is pumped through a hole, for example, by a piston operating in a cylinder or a vane rotatably moving in a pot (casing). The rate of piston or vane movement is set by the orifice size, the damping is obtained by the resistance of the liquid due to its viscosity, and the object whose movement energy is damped is connected to the piston or vane.

When a gun, such as a cannon, fires its projectile the force of the projectile leaving the cannon is absorbed by a controlled backward movement (recoil) of the cannon barrel. In addition, appreciable return energy of the cannon barrel components must be dissipated during its latter motion in counter-recoil to prevent induced destructive forces on the main weapon system structure. It is known that hydraulic shock absorbers may be used as the recoil mechanism to dissipate part of the energy of the cannon's recoil. Such a recoil mechanism must be reliable, rugged and accurate. The cannon recoil motion starts rapidly and its force may be large. The field environment of the cannon and its recoil mechanism may be difficult and may include sand, dust, dirt and water.

OBJECTIVES AND FEATURES OF THE INVENTION

It is an objective of the present invention to provide a hydraulic recoil mechanism which, although relatively compact in size, will provide sufficient energy absorption to act as the main recoil device for a cannon.

It is a further objective of the present invention to provide such a recoil mechanism which is relatively rugged so that it may be utilized in adverse field environments.

It is a further objective of the present invention to provide such a recoil mechanism which provides a smooth and relatively constant damping action.

It is a further objective of the present invention to provide such a recoil mechanism which utilizes relatively few parts and which does not require adjustment in use, so that maintenance problems may be minimized. This objective is achieved by combining recoil, counter-recoil and temperature compensator devices into a single integral unit and thereby reducing the number of required seals.

It is a further objective of the present invention to provide such a recoil mechanism which may be operated repeatedly in rapid succession without failure, for example, as the main recoil mechanism for a rapid fire or automatic cannon.

It is a feature of the present invention to provide a recoil mechanism which is especially adapted for use with a rapidly fired cannon. The recoil mechanism consists of a hydraulic cylinder case assembly which includes an elongated tubular case having an imaginary central axis and end caps attached to the case at its opposite ends. A cylindrical piston rod assembly, having a body portion, is positioned and centered within the cylinder case with a fluid-filled primary annulus chamber gap between the said body portion and the inner wall of the case. The piston rod assembly has a portion protruding through one of the end caps for sliding motion therein and along the axis of the case. The piston rod assembly has a fluid-filled secondary chamber cavity and a plurality of orifices connecting the gap to its cavity.

An elongated cylindrical buffer spear and control rod is fixed to the case within the cavity. In order to facilitate weapon function and prevent destructive forces on the main weapon structure, it becomes desirable to not dissipate the total recuperator spring counter-recoil energy over the entire return stroke; but rather a small final portion to assure the barrel returns to its initial position. The mechanism of the present invention is also used to absorb counter-recoil energy of the cannon barrel components during latter piston rod return motion. The control rod has a tapered outer wall. The piston rod assembly body portion has spaced raised circumferential shoulders on its exterior wall of said body portion. A ring-like freely rotatable piston is held between the shoulders for limited axial movement therebetween. The floating piston, on counter-recoil, forms a by-pass orifice. Upon recoil and the sliding motion of the piston rod assembly relative to the case, hydraulic fluid will be pumped from the primary annulus chamber gap and through the orifices into the secondary chamber cavity to dissipate the energy of recoil. An external hydraulic fluid replenisher unit is not needed.

It is a further feature of the present invention to provide a compensator assembly fixed to the case assembly at its end opposite to said piston rod assembly. If the hydraulic fluid expands due to heat, for example, heat generated by rapidly repeated firing of a cannon, the excess fluid is passed through an orifice and into the chamber of the compensator assembly. The compensator assembly includes an elongated tubular casing, a compensator end cap attached to the compensator casing and having an orifice therethrough, a piston disk slidably mounted in the compensator casing and a compression spring normally urging (loading) the piston disk toward said compensator end cap. The excess fluid forces the piston disk backwards against the spring force, until equilibrium, and is returned to the main chamber upon subsequent fluid cooling and contraction. The recoil, counter-recoil, and compensator assembly are housed within the same casing.

BRIEF DESCRIPTION OF THE DRAWINGS

Other objectives and features of the invention will be apparent from the following detailed description of the invention, giving the inventor's presently known best mode of practicing the invention. The detailed description should be taken in conjunction with the accompanying drawings, in FIG. 1 is a side plan view, partly in cross-section, of the recoil mechanism of the present invention.

DETAILED DESCRIPTION OF THE INVENTION

The present invention is of a hydraulic energy dissipative recoil mechanism which may, for example, be used as the main recoil mechanism in connection with a cannon or other device. During the recoil stroke it provides a continually diminishing orifice, i.e., continually diminishing fluid flow.

The recoil mechanism includes four major components, which are the cylinder shell assembly 10, the piston rod assembly 20, the compensator assembly 30, and the buffer spear shaft assembly 40.

Figure 5:
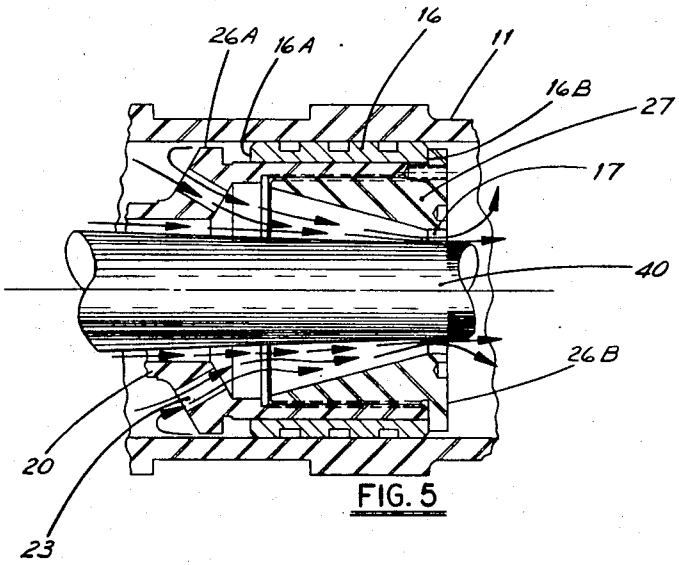
FIG. 5 is a simplified diagram showing, in cross-sectional view, the fluid flow during recoil.

The piston rod assembly is connected to the device whose recoil energy is to be absorbed. When the recoil occurs, in the direction of the arrow A of FIG. 1, the piston rod assembly will move within the cylinder shell assembly and pump hydraulic fluid, such as a hydraulic oil, through circumferential orifices 23 in FIG. 5 (ports) in the piston rod assembly. The size of the orifices, the geometry of the tapered control rod, piston rod assembly, the buffer spear shaft assembly and the cylinder shell assembly are selected so that energy absorption follows the desired curve, or may be relatively constant, and the recoil mechanism will absorb a relatively large amount of energy for the size of the mechanism.

Figure 1:
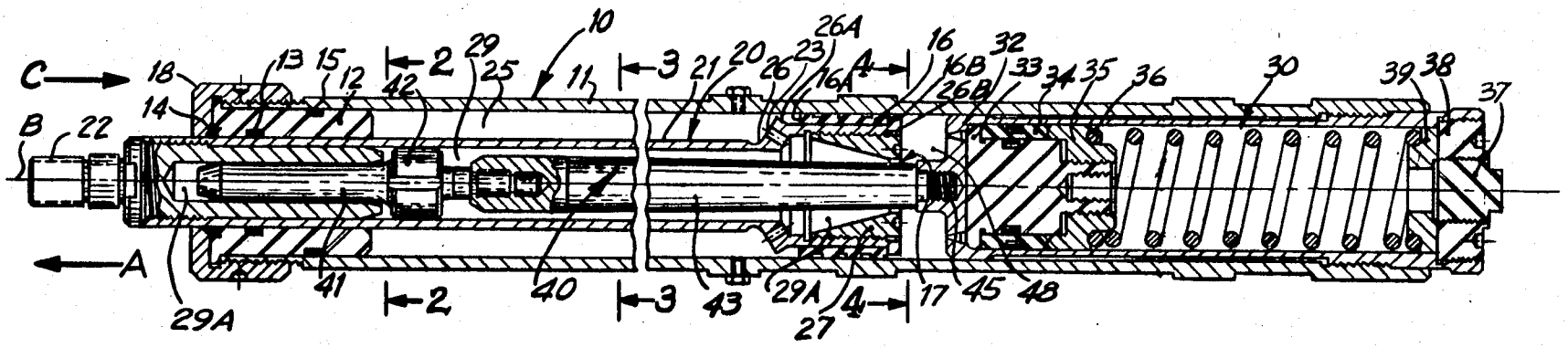
Figure 2:
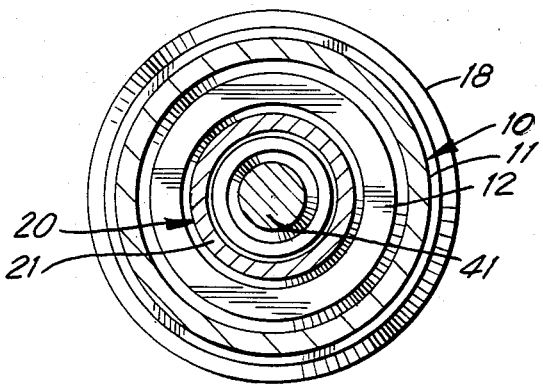
FIG. 2 is an enlarged cross-sectional view, taken along lines 2—2 of FIG. 1.
Figure 3:
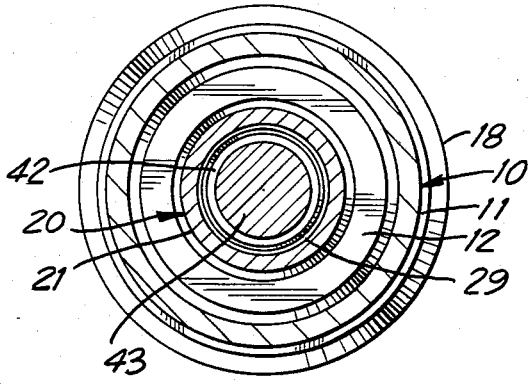
FIG. 3 is an enlarged cross-sectional view, taken along lines 3—3 of FIG. 1.
Figure 4:
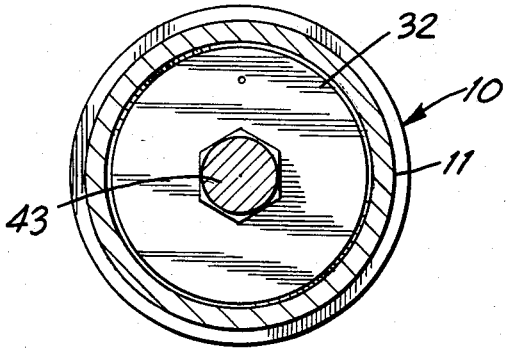
FIG. 4 is an enlarged cross-sectional view, taken along lines 4—4 of FIG. 1.

As shown in FIG. 1, the cylinder shell assembly 10 includes the cylinder shell 11, which is a metal tubular member having a bore with a constant internal diameter. The imaginary axis of the cylinder shell 11, which is axis B, is along the length of the cylinder shell 11. At one end of the shell 11, the left end as shown in FIG. 1, there is positioned an elongated seal ring 12 which seals the primary annulus chamber gap 25, the toroidal-shaped space between the cylinder shell 11 and the piston rod assembly 20. The seal ring 12 is sealed against hydraulic pressure by the static seal 15 which may be a piston type of seal. The seal ring 12 is fixed relative to the cylinder shell 11 and it has an upraised flange which is held between the end of the cylinder shell 11 and the end cap 18, which is threaded onto the exterior end of the cylinder shell 11. In addition to the seal 15 between the seal ring 12 and the cylinder shell 11, the seal ring has a pair of seals consisting of the scraper seal ring 14 at its end and the dynamic seal ring 13, both of which are held between the seal ring 12 and the piston rod assembly.

The seal rings act to prevent leakage of the hydraulic fluid from the recoil mechanism. The normal operating pressure of the recoil mechanism is 2100 pounds per square inch, although the tesring pressure should be considerably higher, for example, 3000 pounds per square inch. The seals mentioned above, as well as the other seals of the recoil mechanism, must be sufficient to withstand such high hydraulic pressures and prevent any leakage of the hydraulic fluid.

A floating piston 16, having respective left and right faces 16A, 16B, is positioned in the primary annulus chamber gap 25 (between the inner wall of the cylinder shell 11 and the outer wall of the piston rod assembly 20). The floating piston 16 is an axially elongated ring-like member which acts as a seal between the piston rod assembly and the internal wall of the cylinder shell 11. It is carried, with some free axial movement, by the shoulders 26A, 26B of the piston rod assembly, so that it moves along with the piston rod assembly. All by-pass orifices, due to the floating piston 16, are closed during the recoil motion in the direction A of the piston rod assembly 20, e.g., right face 16B contacts shoulder 26B, see FIG. 5.

Figure 6:
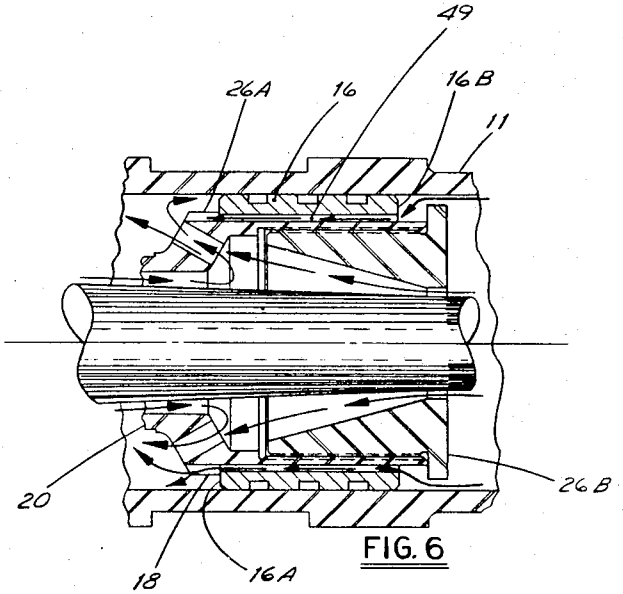
FIG. 6 is a simplified diagram showing, in cross-section, the fluid flow during counter-recoil.

During counter-recoil motion in the direction C, left face 16A contacts shoulder 26A, allowing fluid to flow in the gap 49 behind right face 16B, under the floating piston 16 and through the by-pass orifice 18, with unrestricted flow, see FIG. 6.

The piston rod assembly 20 includes the piston rod cylinder 21, which is an elongated hollow member, and an attachment rod and cap 22 which is connected at the end of the piston rod cylinder so that the attachment rod and cap move with the piston rod cylinder 21. The attachment rod and cap have exterior screw threads which are screwed to the mechanism whose energy is to be dissipated. Energy dissipation results from the resistive forces created by the continually diminishing metering orifice 17 which is consumated by the recoiling motion of the piston rod assembly 20 and the tapered control rod 43. Also, the gap 25 between the internal wall of the cylinder 21 becomes progressively smaller. The piston rod cylinder 21 near its end (its righthand end as shown in FIG. 1) has an inclined flange 26 having a plurality of circumferential piston rod orifices 23 (ports). The hydraulic fluid is pumped through these orifices 23 from within the primary annulus chamber gap 25 into the secondary chamber upon movement of the piston rod assembly in the direction of arrow A. The end of the piston rod assembly is closed by the end plug 27 which has a fixed orifice.

A compensator assembly is used for temperature compensation and fluid overflow. When the temperature rises, the volume of the fluid expands and flows into the overflow chamber of the compensator assembly. The compensator assembly 30 includes a compensator body 32, which is a cylindrical tubular member having an integral end whose exterior diameter fits closely to the internal diameter of the cylinder shell 11. The compensator body at its outer end, the right side as shown in FIG. 1, is screwed into the cylinder shell 11. The compensator assembly also includes a movable compensator piston 33, a cylindrical member which moves within the compensator body 32 to form a variably sized overflow chamber. Seal ring 34 provides a seal between the compensator piston 33 and the internal wall of the compensator body 32. A spring cap 35 is positioned next to the seal ring 34 and in the gap between the compensator body 32 and the compensator piston 33. A strong coil spring 36 is compressed between the spring cap 35 and the spring retainer 38 held by the spring back plate 39, which has an end plug 37 to permit assembly of the unit. The end plug seals the compensator body through spring retainer 38. The compensator spring forces the fluid back into the main chamber when the fluid cools and its volume decreases.

Figure 7:
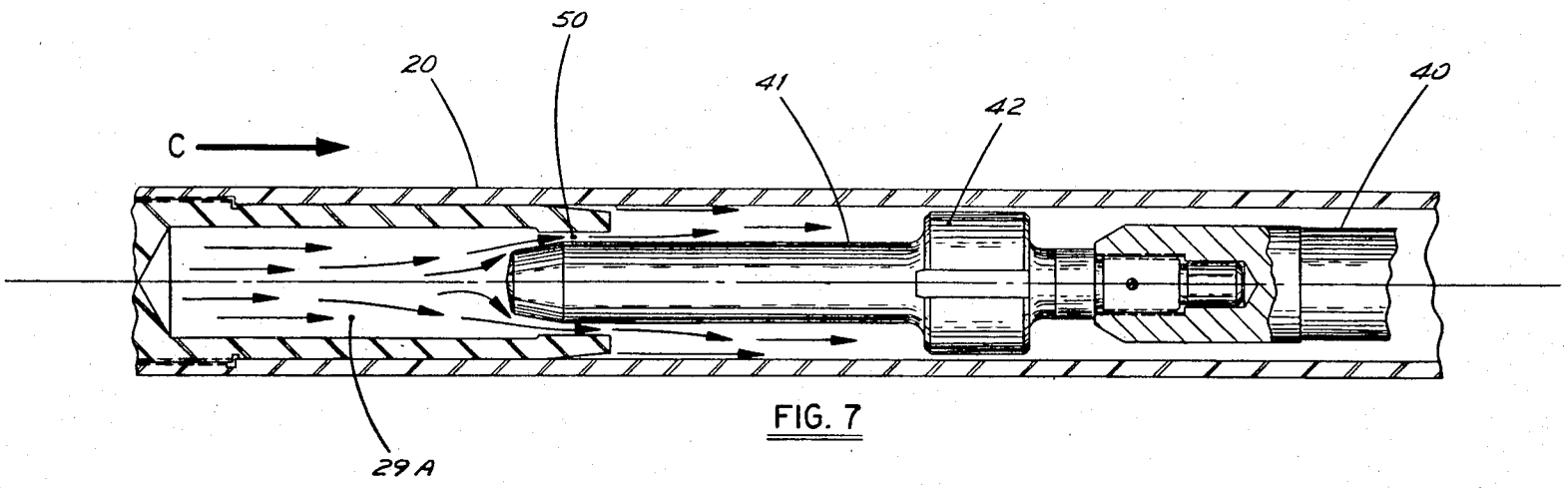
FIG. 7 is a simplified diagram showing, in cross-sectional view, the fluid flow through the buffer spear shaft metering orifice.

The buffer spear shaft assembly 40 is fixed relative to the shell assembly 10 via threaded connection to this compensator body 32. It includes a buffer spear 41 in FIG. 7 whose free end protrudes, with an annulus orifice thereabout into an end cavity 29A, of the piston rod assembly 20. Counter-recoil energy dissipation is governed by resistive forces created by the fixed buffer spear entering and passing through the returning cavity 29A in the piston rod assembly 20, thus effecting a constant metering annulus orifice 50. The buffer spear 41 is cylindrical and round in cross-section with a constant outer diameter along its axial length. It has a cylindrical shoulder portion 42 and it is fixed into one end of the tapered control rod 43. The opposite end of the tapered control rod 43 is fixed, with a pin dowel 45, into the end of the compensator body 32. The outer wall of the control rod 43 is tapered so that its diameter becomes progressively smaller toward the compensator assembly.

In operation, upon recoil (in the direction of movement of arrow A), the piston rod assembly 20 slides axially and the hydraulic fluid is pumped from the primary annulus chamber gap 25 through the circumferential orifices 23 and into the secondary chamber cavity 29, and newly created primary chamber 48.

In operation, on counter-recoil (in the direction of movement of arrow C), the reverse motion of the piston rod assembly 20 compresses the fluid against the right face 16B of the floating pistion, moving it against the shoulder 26A to ita alternate stop position and opening a by-pass valve. The fluid, with very little resistance, is pumped from the cavity 48 to the primary annulus gap 25 through the orifices 23 and the by-pass valve. The floating piston does not seal on the shoulder 26A, but forms a fluid path on counter-recoil, but does seal on the shoulder 26B during recoil.

What is claimed is:

1. A recoil mechanism comprising:

a hydraulic cylinder case assembly including an elongated tubular case having an imaginary central axis and end caps attached to said elongated tubular case at opposite ends thereof;

a cylindrical piston rod assembly having a body portion positoned and centered within said hydraulic cylinder case with a fluid-filled chamber between said body portion and the inner wall of said elongated tubular case, said cylindrical piston rod assembly having a portion thereof protruding through one of said end caps for sliding reciprocating motion therein and along the axis of said hydraulic cylinder case, said cylindrical piston rod assembly having a fluid-filled cavity therein and a plurality of orifices connecting said fluid filled chamber and said fluid-filled cavity;

and an elongated cylindrical tapered control rod fixed to said eiongated tubular case within said fluid-filled cavity and having an outer wall spaced from the inner wall of said cylindrical piston rod assembly;

wherein upon sliding motion of said cylindrical piston rod assembly in one direction relative to said hydraulic cylinder case hydraulic fluid will be pumped from said fluid-filled chamber and through said orifices into said fluid-filled cavity to dissipate the energy of recoil.

2. A recoil mechanism as in claim 1 wherein said cylindrical piston rod assembly has a body portion with spaced raised circumferential shoulders on the exterior wall of said body portion, and said recoil mechanism further comprises a hydraulic fluid valve mechanism including a ring-like freely floating piston having a right and, left face enclosed between said spaced raised circumferential shoulders in said fluid-filled chamber for limited axial movement relative to said cylindrical piston rod assembly, the spacing of the said spaced shoulders being greater than the axial length of the ring-like freely floating piston, whereby upon axial movement of said cylindrical piston rod assembly in one direction of movement the right face of said ring-like freely floating piston is restrained against one of said spaced raised circumferential shoulders to prevent fluid from passing about said spaced raised circumferential shoulder during recoil.

3. A recoil mechanism as in claim 2 further comprising a compensator assembly fixed to said elongated tubular case at the end thereof opposite to said cylindrical piston rod assembly, said compensator assembly including a compensator elongated tubular casing, a compensator body 32 attached to said compensator elongated tubular casing and having an orifice therethrough, a movable compensation piston 33 slidably mounted in said compensator elongated tubular casing and a spring normally urging said compensating piston toward said compensator body.

4. A recoil mechanism as in claim 3 and further including seal means closing said chamber and comprising a dynamic seal fixed to said cylindrical piston rod assembly.

5. A recoil mechanism comprising:

a hydraulic cylinder case assembly including an elongated tubular case having an imaginary central axis and end caps attached to said elongated tubular case at opposite ends thereof;

a cylindrical piston rod assembly having a body portion positioned and centered within said hydraulic cylinder case with a fluid-filled chamber between said body portion and the inner wall of said elongated tubular case, said cylindrical piston rod assembly having a portion thereof protruding through one of said end caps for sliding reciprocating motion therein and along the axis of said elongated tubular case, said cylindrical piston rod assembly having a fluid-filled cavity therein and a plurality of orifices connecting said fluid-filled chamber and said fluid-filled cavity, said body portion having spaced raised circumferential shoulders on its exterior wall;

and a hydraulic fluid valve mechanism including a ring-like freely floating piston enclosed between said spaced raised circumferential shoulders and in said fluid-filled chamber for limited axial movement relative to said cylindrical piston rod assembly, the spacing of the said spaced shoulders being greater than the axial length of the ring-like freely floating piston, whereby upon axial movement of said cylindrical piston rod assembly in one direction of movement said ring-like freely floating piston is restrained against one of the said shoulders to prevent fluid from passing about said spaced raised circumferential shoulders; and wherein upon sliding motion of said cylindrical piston rod assembly in one direction relative to said elongated tubular case hyoraulic fluid will be pumped from said fluid-filled chamber and through said orifices into said fluid-filled cavity to dissipate the energy of recoil.

6. A recoil mechanism as in claim 5 and further comprising a ccmpensator assembly fixed to said elongated tubular case at the end thereof opposite to said cylindrical piston rod assembly, said compensator assembly including a compensator elongated tubular casing, a compensator body 32 attached to said compensator elongated tubular casing and having an orifice therethrough, a movable compensation piston slidably mounted in said compensator elongated tubular casing and a spring normally urging said movable compensation piston toward said compensator body.

7. A recoil mechanism as in claim 6 and further including seal means closing said chamber and comprising a dynamic seal fixed to said cylindrical piston rod assembly.

8. A recoil and counter-recoil mechanism comprising:

a hydraulic cylinder case assembly including an elongated tubular case having an imaginary central axis and end caps attached to said elongated tubular case at opposite ends thereof;

a cylindrical piston rod assembly for pumping hydraulic fluid and having a body portion positioned and centered within said hydraulic cylinder case with a fluid-filled chamber between said body portion and the inner wall of said elongated tubular case, said cylindrical piston rod assembly having a portion thereof protruding through one of the said end caps for sliding reciprocating motion therein and along the axis of said elongated tubular case, said cylindrical piston rod assembly having a fluid-filled cavity therein and a plurality of orifices connecting said fluid-filled chamber and said fluid-filled cavity;

and an elongated cylindrical buffer spear means to control said pumping during the latter portion of said cylindrical piston rod assembly movement, said elongated cylindrical buffer spear means having an outer wall spaced from the inner wall of said cylindrical piston rod assembly to form an annular orifice;

wherein upon sliding motion in one direction of said cylindrical piston rod assembly relative to said elongated tubular case hydraulic fluid will be pumped from said fluid-filled chamber and through said annular orifice, to said fluid-filled cavity upon recoil, and wherein upon sliding reciprocating motion in an opposite direction of movement fluid will flow from said fluidfilled cavity to said fluid-filled chamber upon counter-recoil.

9. A recoil and counter-recoil mechanism formed as an integral unit and comprising as parts of said integral unit:

a hydraulic cylinder case assembly including an elongated tubular case having an imaginary central axis and end caps attached to said elongated tubular case at opposite ends thereof;

a cylindrical piston rod assembly having a body portion positioned and centered within said hydraulic cylinder case with a fluid-filled chamber between said body portion and the inner wall of said elongated tubular case, said cylindrical piston rod assembly having a portion thereof protruding through one of said end caps for sliding reciprocating motion therein and along the axis of said elongated tubular case, said cylindrical piston rod assembly having a fluid-filled cavity therein and a plurality of orifices connecting said fluid-filled chamber and said fluid-filled cavity;

an elongated cylindrical tapered contrul rod fixed to said elongated tubular case and within said cavity and having an outer wall spaced from the inner wall of said cylindrical piston rod assembly;

a floating piston means which moves to cover and uncover a by-pass orifice upon recoil and counter-recoil respectively; and temperature compensation means to compensate for volume changes in said fluid due to changes in its temperature.

* * * * *